Dec. 23, 1947.          R. C. MARCELL          2,433,138
FASTENING DEVICE FOR CONNECTING TWO SEPARABLE MEMBERS
Filed March 18, 1946
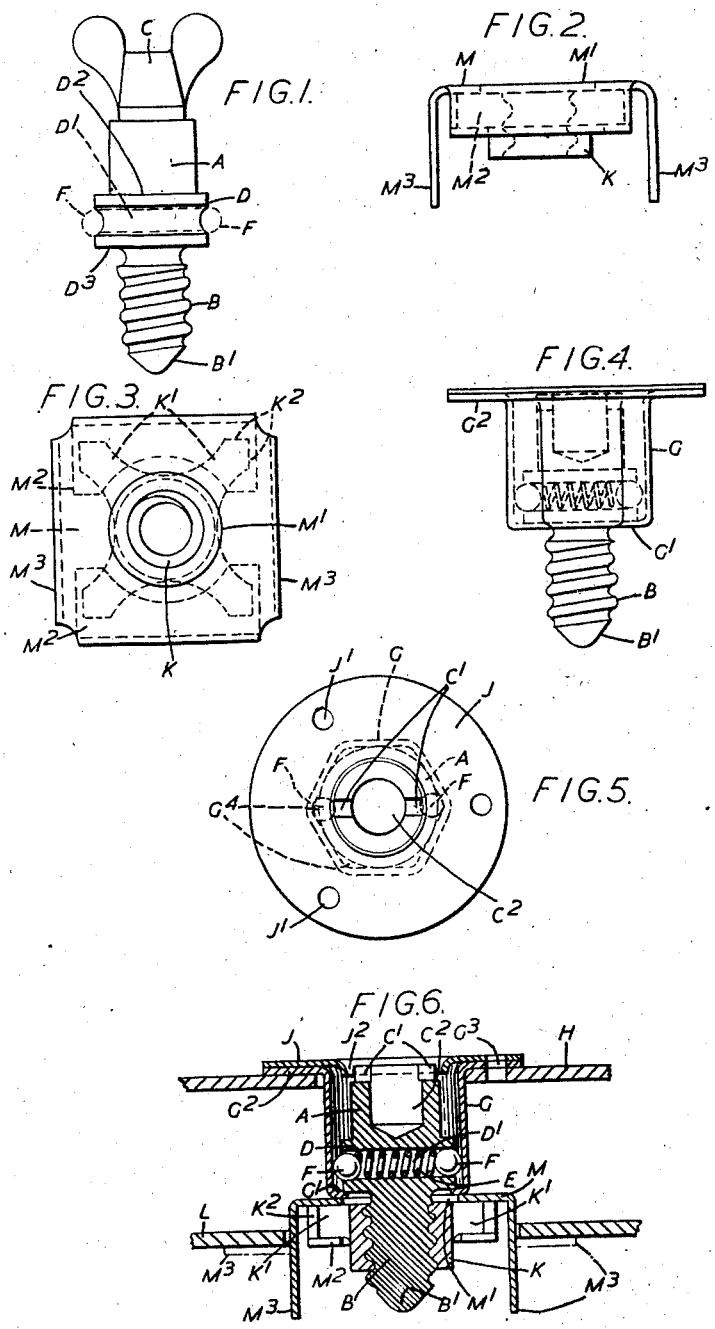
Inventor
REGINALD C. MARCELL
By Emery Holcombe & Blair
Attorney

UNITED STATES PATENT OFFICE 2,433,138

FASTENING DEVICE FOR CONNECTING TWO SEPARABLE MEMBERS

Reginald Claude Marcell, Thames Ditton, England, assignor to D. Napier & Son Limited, London, England, a company of Great Britain Application March 18, 1946, Serial No. 655,297
In Great Britain March 21, 1945

7 Claims. (Cl. 151—32)

This invention relates to fastening devices for connecting two separable members and while suitable for various uses is more especially intended to be employed for the purpose of fastening in place sheet metal and like parts such as those of the cowling of an aircraft or the bonnet of a motor road vehicle where it is essential that the fastening cannot be loosened or become detached owing to vibration.

According to this invention the improved fastening device comprises in combination a screw with a quick-pitch thread, a transverse hole in the body of the screw in which is a ball with a spring behind it causing a part of the ball to project from the side of the screw and function as a detent to hold the screw against unintentional rotation, a housing fixed on one of the separable members and in which the screw is rotatably carried the housing having therein one or more recesses or the like with which the detent on the screw can engage as it is turned each such recess extending longitudinally in the housing and parallel to the axis of the screw, and a nut adapted to be engaged by the screw and so mounted on the second separable member that it is restrained against rotation. Preferably the nut is carried in a cage so that it can float in a direction at right angles to the axis of the nut while being at the same time prevented from rotating, the cage being mounted on the second separable member. This arrangement obviates exact registration between the positions in the two separable parts of the screw and the nut.

As an example of a convenient arrangement the housing in which the screw is rotatably carried and which is in effect an annular and tubular rack, may be hexagonal as seen in a section normal to the axis of the screw, the angles of the housing constituting circumferentially spaced and longitudinally extending recesses with which the detent on the screw can engage when it is turned. The cage containing the nut is preferably polygonal, for example rectangular, in plan and the nut is provided with two or more radially projecting fingers or arms whose ends lie in but do not closely engage the angles of the cage whereby the nut is prevented from turning in the cage but is free to float to a limited extent in a direction normal to the axis of the screw to facilitate its engagement by the screw.

With regard to the detent carried in the screw, by extending the hole in which it is carried right through the screw there may be placed in this hole two balls with a spring between them which will cause parts of both balls to project beyond the contour of the body of the screw and function as two detents. Being diametrically opposite these detents will both simultaneously engage recesses in the housing if these recesses are disposed so that they lie oppositely as they will if they are constituted by the angles of a hexagonal housing. If, however, the housing is otherwise shaped so that the recesses therein are not opposite, for example if the housing is five-sided, then only one of the pair of detents will operate at one time to prevent the rotation of the screw, but the number of rotational positions in which the detents will engage recesses will be increased for each complete turn given to the screw. Thus with a five-sided housing the screw will be held by one of the detents whenever the screw is turned through an angle of 36°, but with a hexagonal housing the screw will be held by the detents only when it is turned through an angle of 60°.

To enable the screw to be rotated it is conveniently provided with a slot or saw-cut running across the end and adapted to be engaged by a screw-driver or like tool. Alternatively there may be a handle, milled head or other formation integral with or mounted on the end of the screw and arranged to permit of the screw being turned by direct hand action.

It will be apparent that with this construction the detents will effectively prevent the screw from slacking back and allowing the fastening to become disengaged even if the parts connected by it are subjected to considerable vibration.

The accompanying drawings illustrate by way of example and on an enlarged scale, the improved fastener as it may be constructed for use in the attachment to an aircraft of parts of the sheet metal cowling. In these drawings, Figure 1 is an elevation of the screw, which is shown apart from its housing, and as provided with a head like a butterfly nut to enable the screw to be turned by the fingers.

Figure 2 is a side elevation of the nut in its cage.

Figure 3 is a plan of the nut in its cage.

Figure 4 is a side elevation of the screw as assembled in its housing, the screw being here shown with a head formed with a slot to enable it to be turned by a screw-driver the head being also sunk in the housing.

Figure 5 is a plan of the screw in its housing as seen in Figure 4.

Figure 6 is a sectional elevation through the assembled parts of the fastener with the screw in engagement with the nut as when the parts on which the screw and nut are respectively mounted are connected by the fastener.

The screw as seen in Figure 1 is formed with a cylindrical body A and at one end a part B which is provided with a quick-pitch thread while at the other end the screw in this case has a head C formed as shown so that it may be turned by the fingers. Between the body A and the screw-thread B is a part D of larger diameter the ends of which provide shoulders which will butt up against the ends of the housing and enable the screw to be retained therein. As it is shown in Figures 4, 5 and 6 the head end of the body A has instead of the head C, a transverse notch $C^1$ to enable it to be engaged and turned by a screwdriver. To save weight this end portion of the screw may be hollowed out as at $C^2$. The end of the threaded part B is conveniently somewhat pointed as at $B^1$ to facilitate its entry into the nut. A hole $D^1$ runs transversely right through the intermediate part D and in this hole lies a coiled spring E and at each end of the spring a ball F. These balls constitute a pair of oppositely placed spring detents which when the screw is in its housing prevent its unintentional rotation.

The housing in which the screw is carried comprises a tubular part G which is hexagonal in cross-section and at one end has an inwardly directed flange $G^1$ around an opening through which extends the threaded portion B of the screw. At the other or outer end the tubular part G has an outwardly directed flange $G^2$ in which are holes $G^3$ for the passage of screws, rivets or bolts by which the housing is attached to a plate H or other member which is to be connected by the fastener to another plate or other part. After the screw has been placed in the housing a cover plate J is applied to the flange $G^2$ to which it is suitably attached by spot welding or otherwise before the housing is mounted in the plate H. The cover plate has in it spaced holes $J^1$ adapted to register with the holes $G^3$ in the flange $G^2$. In the cover plate is a central hole $J^2$ in which lies and through which can pass the head and body portion A of the screw. When the cover plate is in position the screw will be retained in the housing but will be free to move longitudinally therein to a limited extent which is determined by the shoulders $D^2$, $D^3$ formed by the ends of the enlarged part D of the screw which can respectively butt up against the cover plate J around the hole $J^1$ and the flange $G^1$ at what may be termed the inner end of the housing. The housing is of such length that if the screw is moved outwards therein the body part A will pass out through the hole $J^1$ in the cover plate and project therefrom while the threaded portion B will then be withdrawn wholly or almost wholly into the housing. As the screw A, B is turned in the housing G the balls F will be forced outwards by the spring E into the angles $G^4$ of the hexagonal housing and will then offer resistance to unintentional rotation of the screw. In the construction illustrated where the housing is hexagonal the balls at each end of the hole $D^1$ will act similarly and in this case simultaneously as twin detents and offer a substantial resistance to rotation of the screw. If, however, the tubular housing is formed for example five-sided, only one ball at a time will engage an angle in the housing, but the number of angular positions in which the screw can be held by one or other of the detents will be greater than in the construction shown.

This part of the fastening when assembled forms a self-contained unit from which the screw cannot be withdrawn so that parts are not liable to be removed and lost. Also when the screw assembly is mounted in the plate H or like member the flange $G^2$ of the housing and the cover plate J lie on the outer face of the part H and the steel cover plate will afford some protection for the part H around the hole therein in which the housing is fixed and prevent damage such as may occur from misuse of the screw driver used for turning the screw.

The nut K with which the screw B engages is formed with four arms or fingers $K^1$ which project radially and oppositely as seen in Figure 3 from the outer and otherwise cylindrical wall of the nut. The end of each finger is chamfered off as at $K^2$ on each side. This nut lies and can float laterally through a limited range in a cage which is fixed in some convenient manner in an opening in the second of the two members which are to be connected by the fastener, this part being here represented as a plate L indicated in Figure 6. The cage is constituted by a square sheet metal plate M having therein a central hole $M^1$ to permit the passage of the threaded part B of the screw. Along each side of the plate M is an upturned flange the flanges $M^2$ along two opposite sides being folded inwards so that the parts thus inwardly directed lie in a plane parallel to the main part M of the plate from which the inturned parts are spaced apart in the direction of the axis of the nut K. The other two flanges $M^3$ are not bent inwards, but with the flanges $M^2$ enclose a square space beneath the plate M in which lie the fingers $K^1$ of the nut K the ends of these fingers lying in the corners of the space within the cage M, $M^2$, $M^3$. As may be seen in Figure 3 there is a clearance for the nut K beyond the inturned edges of the flanges $M^2$ which are curved to allow this and the arrangement is such that while the fingers $K^1$ lying in the angles of the cage prevent the nut K from turning in the cage, the nut can float in the cage and has freedom for limited movement in directions transverse to its axis. The flanges $M^3$ are conveniently left upstanding and serve for the attachment of the cage to some suitable part of the member to which the plate H or other member is to be connected by the screw A, B. Holes for rivets, screws and the like are provided in the flanges $M^3$ and these flanges may be bent or shaped as may be found desirable to facilitate their attachment to the member on which the cage is mounted.

The cage may be formed and shaped otherwise than as described above and shown in the drawings, the essential features, however, being that it will hold the nut against rotation while connecting it in a suitable manner to the part on which the nut is to be mounted. Though it is preferable that the nut be carried in the cage in such a way that it is free to float therein, this arrangement is not always necessary as for instance where there is no difficulty in ensuring accurate registration between the nut on a relatively fixed member and the screw on the member which is to be detachably connected to the fixed member. In some cases where the nut is permitted to float in the cage it may be provided with only two radial fingers such as $K^1$, these fingers then being oppositely directed. In another case the nut may have three radial fingers spaced circumferentially 120° apart and the cage then may have a triangular shape.

In use the outer member H carrying the screw A, B is placed in position and owing to the floating nut K there will be no difficulty in getting the end B¹ of the screw to enter the nut and the screw can then be turned and screwed home. With an outer member H thus connected to a second or inner member L, the outer member can be quickly attached or removed and when fixed in place the fastenings are not liable to come loose or the screws to be slacked back by vibration since accidental or unintentional rotation of each screw cannot occur owing to the action of the detents in preventing such rotation.

It is a feature of the construction that the screw A, B has some freedom for movement longitudinally, that is in the direction of its axis, within the housing G so that the fastener can operate and the screw can engage the nut K without the necessity for the panels or other members H, L on which these two parts are mounted being in close contact. The freedom for lateral movement on the part of the nut K, as referred to above, in obviating the need for exact register between the parts in order to ensure their engagement cooperates with the longitudinal movement of the screw to enable the fastener to be used under conditions where exact fitting of the fasteners does not happen to occur or is not practicable.

Where the fastening is to be used, for example, on a door or panel in a place where it may be subjected to vibration, the outer end of the screw may be prolonged and on this may be mounted and fixed in some suitable manner a handle having a shape convenient for the purpose.

For some purposes it may suffice to provide the housing G with a single longitudinal recess or groove somewhat like the angles G⁴ of the hexagonal housing and adapted to be engaged by one or a pair of detents carried by the screw. In such a construction the housing may be cylindrical with a groove pressed out along it at one side, or such a groove may be formed by pressing inwards two parallel ridges. Yet again there may be a series of such parallel ridges, formed by pressing the metal either inwards or outwards, and equally spaced apart circumferentially. A housing thus formed would function in effect as an annular tubular rack over which the spring detent or detents carried by the screw could move as the screw is turned.

Where it is not necessary for the screw to carry a pair of detents, the transverse hole in the body of the screw need not be drilled right through, or one end may be plugged. However, by providing a pair of oppositely acting detents the radial pressure exerted by the spring is balanced and there is no lateral pressure on the screw itself.

What I claim as my invention and desire to secure by Letters Patents is:

1. A fastener for connecting two separable members comprising in combination a screw with quick pitch thread, a transverse hole in the body of the screw in which is at least one ball with a spring behind it causing a part of the ball to project yieldingly from the side of the screw and function as a detent to hold the screw against unintentional rotation, a housing fixed on one of the separable members and in which the screw is rotatably carried the housing having therein at least one groove running longitudinally and parallel to the axis of the screw such groove being engaged by the said detent on the screw as it is turned in the housing, and a nut adapted to be engaged by the said screw and so mounted on the second of the two separable members that it is restrained against rotation.

2. A fastener for connecting two separable members comprising in combination a screw with a quick pitch thread, a transverse hole in the body of the screw in which is at least one ball with a spring behind it causing a part of the ball to project yieldingly from the side of the screw and function as a detent to hold the screw against unintentional rotation, a housing fixed on one of the separable members and in which the screw is rotatably carried the housing having therein at least one groove running longitudinally and parallel to the axis of the screw such groove being engaged by the said detent on the screw as it is turned in the housing, a cage mounted on the second of the two separable members, and a nut adapted to be engaged by the said screw and carried in the cage wherein it is restrained against rotation but is free to float to a limited extent in directions at right angles to the axis of the nut.

3. A fastener having in combination the parts as set out in claim 1 in which the said housing for the screw is formed as an annular and tubular rack wherein the screw is carried so that it can not only turn when the rack will be engaged by the detent in the screw, but the screw can also move longitudinally in the housing to a limited extent.

4. A fastener having in combination the parts as set out in claim 1 in which the said housing for the screw is formed tubular and polygonal in a section normal to the axis of the screw, the angles in the tube constituting circumferentially spaced and longitudinally extending grooves each of which may be engaged by the detent in the screw as this is turned in the housing, the screw being carried in the housing so that it can move longitudinally therein.

5. A fastener having in combination the parts as set out in claim 4 in which the said housing for the screw is formed tubular and hexagonal in a section normal to the axis of the screw.

6. A fastener for connecting two separable members comprising in combination a screw with a quick pitch thread, a hole running transversely through the body of the screw, a coiled spring disposed in this hole, a ball in each end of the hole and pressed outwards by the spring between the balls so that each ball will tend to project beyond the contour of the body of the screw and function as a detent to hold the screw against unintentional rotation, a housing fixed on one of the separable members and in which the screw is rotatably carried the housing having therein at least one groove running longitudinally and parallel to the axis of the screw such groove being engaged in turn by each of the said detent balls as the screw is turned in the housing, and a nut adapted to be engaged by the said screw and so mounted on the second of the two separable members that it is restrained against rotation.

7. A fastener having in combination the parts as set out in claim 2 in which the said cage is polygonal as seen in plan and the nut therein has a plurality of radially projecting fingers whose ends lie in but do not closely engage the angles of the cage whereby the nut is prevented from turning in the cage but is free to float to a limited extent in directions at right angles to the axis of the nut.

REGINALD CLAUDE MARCELL.